United States Patent [19]

Eneboe et al.

[11] Patent Number: 5,689,725

[45] Date of Patent: Nov. 18, 1997

[54] SYSTEM FOR GENERATING STATUS SIGNALS OF SECOND BUS ON FIRST BUS BY COMPARING ACTUAL PHASE OF THE SECOND BUS WITH EXPECTED PHASE OF SECOND BUS

[75] Inventors: Michael K. Eneboe, San Jose; Kevin M. Christiansen, Saratoga; Bruce E. Eckstein, Cupertino, all of Calif.

[73] Assignee: Apple Computer, Inc., Cupertino, Calif.

[21] Appl. No.: 432,818

[22] Filed: May 2, 1995

[51] Int. Cl.$^6$ .................................................. G06F 15/02
[52] U.S. Cl. ............................................................ 395/825
[58] Field of Search ................................. 395/821, 825, 395/826, 827, 835, 837, 838, 839, 844, 299, 800, 287, 293, 733, 735, 737, 738, 823, 824, 829, 846, 591

[56] References Cited

U.S. PATENT DOCUMENTS

| | | | |
|---|---|---|---|
| 3,728,693 | 4/1973 | Macken et al. | 395/853 |
| 3,972,030 | 7/1976 | Bailey, Jr. | 395/825 |
| 4,514,673 | 4/1985 | Sfarti | 318/685 |
| 5,155,821 | 10/1992 | Sone et al. | 395/183.11 |
| 5,392,706 | 2/1995 | Drew et al. | 101/170 |
| 5,452,469 | 9/1995 | Sone et al. | 395/800 |

OTHER PUBLICATIONS

"X3T9.2/855D, Revision 12b, Jun. 7, 1993, Reference No. ISO/IEC; 199x/ANSI X3.199x", printed Jun. 11, 1993, pp. i–ix and 1–65.

*Primary Examiner*—Moustafa M. Meky
*Attorney, Agent, or Firm*—Burns, Doane, Swecker & Mathis, L.L.P.

[57] ABSTRACT

The present invention is therefore directed to enhancing the efficiency with which input/output controllers execute operations in response to requests from another device, such as a main controller. In accordance with exemplary embodiments, a compact set of status information signals is communicated from an input/output controller to a main controller such that the main controller can provide error control (that is, monitor input/output controller operation) without the use of interrupts. As a result, the main controller can sequentially and continuously supply multiple commands of a transaction to the input/output controller without the use of a multiple hardware interrupts. System hardware can therefore be used more efficiently and input/output controller operation can be accelerated, thereby increasing system performance.

24 Claims, 2 Drawing Sheets

SYSTEM FOR GENERATING STATUS SIGNALS OF SECOND BUS ON FIRST BUS BY COMPARING ACTUAL PHASE OF THE SECOND BUS WITH EXPECTED PHASE OF SECOND BUS

BACKGROUND OF THE INVENTION

1. Field of the Invention

The present invention relates generally to the operation of input/output (I/O) controllers, and more particularly, to a method and apparatus for enhancing the operation of such devices.

2. State of the Art

Input/output controllers are widely used in computer system architectures as main controller interfaces. Input/output controllers typically execute information transfer operations between the main controller and peripheral devices connected to a local bus of the input/output controller.

Many input/output controllers do not communicate with the peripheral devices using any form of bus protocol. Accordingly, error detection and monitoring (for example, detection of protocol violations) is not provided. Those input/output controllers which do provide some form of error control use a conventional interrupt mechanism to signal the main controller upon completion of each executed instruction. After the main controller has acknowledged an interrupt request, an interrupt field must be examined to identify the source of the interrupt and to confirm that a requested command was properly executed.

The use of interrupt mechanisms for input/output controllers can significantly degrade the efficiency of operation. For example, consider an input/output controller which receives a command from the main controller via a main controller bus (that is, a bus which interconnects the main controller and the input/output controller). The command can, for example, be a request that the input/output controller arbitrate for access to its local bus so that a data transfer can be performed between the main controller and a peripheral device connected to the local bus. In response to this request, the input/output controller will attempt to execute the command (that is, arbitrate for the local bus). Regardless of whether the input/output controller was successful in arbitrating for its local bus, an interrupt is generated when the input/output controller finishes executing.

Although the input/output controller has finished executing the command and generated an interrupt to the main controller, it may not have been successful in executing the arbitration command for a variety of reasons. For example, the local bus may have been busy or a protocol violation may have occurred. Therefore, once the main controller acknowledges the interrupt, it must examine an interrupt field to determine whether the command has been successfully executed.

Such error control operations are complex and timely. Further, such operations are unduly inefficient since the input/output controller cannot execute another command until the interrupt generated in response to a previous command has been acknowledged and serviced by the main controller. In the above example, only after the main controller has serviced an interrupt to confirm that the input/output controller successfully arbitrated for the local bus can a data transfer command be issued by the main controller. A transaction which involves multiple commands is therefore not efficiently executed by conventional input/output controllers.

Accordingly, it would be desirable to enhance the operation of input/output controllers to improve the manner by which such controllers process data and communicate with a main controller so that system hardware can be used more efficiently.

SUMMARY OF THE INVENTION

The present invention is directed to enhancing the efficiency with which a first controller, such as an input/output controller, executes operations in response to requests from another device, such as a second controller. In accordance with exemplary embodiments, a compact set of status information signals is communicated from the first controller to the second controller, such as a main controller, so that the main controller can provide error control (that is, monitor input/output controller operation) without the use of interrupts. As a result, the main controller can sequentially and continuously supply multiple commands of a transaction to the first controller without the use of multiple hardware interrupts. System hardware can therefore be used more efficiently and system controller operation can be accelerated, thereby increasing performance.

In general, exemplary embodiments of the present invention relate to a method and apparatus for accelerating operation of a first controller which communicates with a second controller. An exemplary method includes steps of receiving information from the second controller which designates an operation to be executed by the first controller and, upon execution of said operation, generating an operation status of said first controller for transmission to said second controller, said operation status being selected from among a group of status responses which include: (1) supplying a first output signal to the second controller, said first output signal being indicative of the first controller having completed execution of said operation; (2) supplying said first output signal and a second output signal to the second controller, said second output signal being indicative of an acceptable, but undesired condition during execution of said operation; and (3) supplying said first output signal and a third output signal to the second controller, said third output signal being indicative of an unacceptable error condition during execution of said operation, with a supply of said first output signal in an absence of said second output signal and said third output signal being indicative of successful execution of said operation.

BRIEF DESCRIPTION OF THE DRAWINGS

The present invention can be further understood with reference to the following description and the appended drawings, wherein like elements are provided with the same reference numerals. In the drawings.

DETAILED DESCRIPTION OF THE PREFERRED EMBODIMENTS

Figure 1:
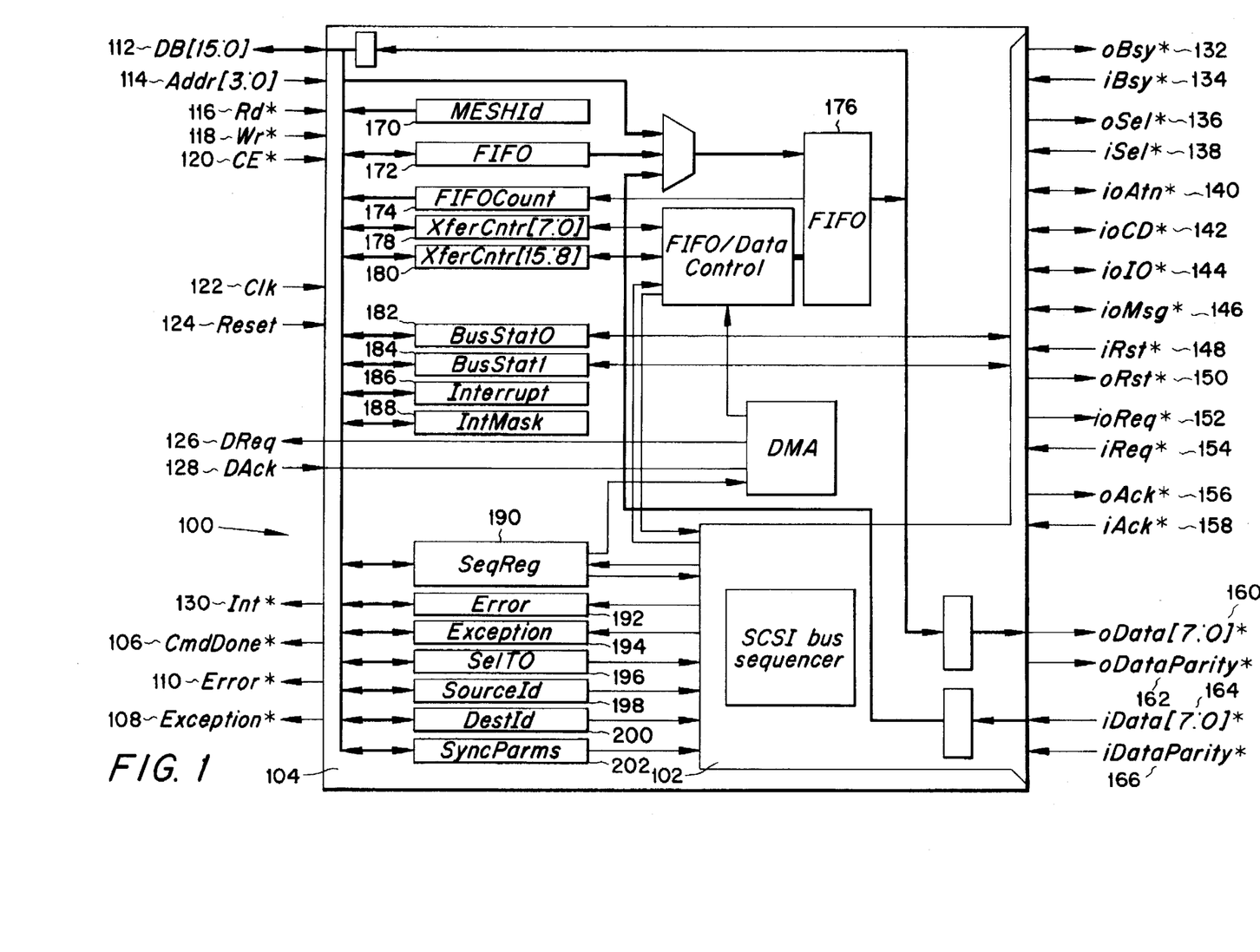
FIG. 1 shows a controller for providing status signals in accordance with an exemplary embodiment of the present invention.

FIG. 1 illustrates an exemplary embodiment of a first device or controller means which can, for example, be used as a peripheral device interface for a second device or controller. For purposes of illustrating features of the present invention, the first controller is represented in FIG. 1 as an input/output controller, in particular, a small computer system interface (SCSI). The first controller of FIG. 1 communicates over a first main bus with a second controller, referred to herein as a main, or host controller (not shown). The first controller interfaces the main controller to one or more devices connected to a second, local bus of the first controller.

Those skilled in the art will appreciate that the first controller can either initiate an input/output process requested by the main controller (initiator mode) or respond to a request from a device on the local bus to perform an input/output process (that is, serve as a target in a target mode).

Where the first controller is a small computer system interface, distributed arbitration can be included as bus contention logic for the local bus. A priority system can be used to award control to the highest priority device requesting access to the first controller's local bus in any known fashion.

Although the exemplary FIG. 1 embodiment of a first controller is described in the context of a small computer system interface, it will be appreciated that such an embodiment is by way of illustration only. The present invention is not limited to enhancing operation of small computer system interfaces; rather, those skilled in the art will appreciate that advantages of the present invention can be realized for any controller used as an interface. For example, the invention is equally applicable to network interface controllers, such as ethernet controllers, which control access of a device to a network. Further, those skilled in the art will appreciate that features of the present invention are applicable to any protocol-based controller which can autonomously transition signal lines through multiple phases or states. For example, the invention is equally applicable to serial interfaces which toggle signal lines through various handshaking signal states.

Exemplary embodiments are directed to enhancing communication of a first controller with a second controller by eliminating the use of a hardware interrupt mechanism to signal completion of each executed command in a transaction. In contrast, status signals are used which can be monitored by the second controller. The status signals provide specific, immediate status information without requiring the second controller to acknowledge and service an interrupt field. Exemplary embodiments therefore significantly reduce the time required for the first controller to execute plural requests, and thereby accelerate operation.

In accordance with the exemplary embodiment of FIG. 1, wherein the first controller is a small computer system interface for a second, main controller, the status signals can be generated by means which monitor the local bus of the small computer system interface. The first controller knows the phases its local bus must go through to execute a complete transaction requested by the main controller. A transaction can include any number of commands and can, for example, be defined as the transition of the local bus from a bus free condition, through one or more operational phases, back to a bus free condition. Provided the first controller's local bus enters the correct sequential phases during execution of the complete transaction, each command will be completed without any generation of an interrupt to the main controller (that is, with minimum support from the main controller). Upon completion of an entire transaction, a single interrupt can be supplied by the first controller to the main controller via the main bus. Such a method of operation can be contrasted with conventional protocol-based input/output controllers wherein an interrupt flag is set upon completion of each command.

Exemplary embodiments of the present invention enable plural commands of one or more transactions to be executed in sequence provided no exception or error conditions occur during execution of the transaction. An exception condition, for purposes of the exemplary embodiments described herein, can be configured by the user as any acceptable, but undesired condition. For example, an unsuccessful attempt by the small computer interface to arbitrate for access to its local bus in response to a request from the main controller can be considered an acceptable, but undesired condition. In response to a user defined exception condition, the first controller generates an Exception signal which is monitored by the main controller and which indicates that the main controller should request re-execution of the command. Such operation can thus be performed without generating an interrupt to the main controller.

An error condition, for purposes of the exemplary embodiments described herein, can be configured by the user as any unacceptable condition, which requires special intervention by the main controller. In response to a user defined error condition, the first controller generates an Error signal which is monitored by the main controller and which indicates that special intervention by the main controller is required. For example, occurrence of a protocol violation of the first controller's local bus can be indicated to the main controller as an error without the use of an interrupt. In response, the main controller can, for example, attempt to re-execute the entire transaction.

Where a command is executed without the occurrence of any user-defined exception or error condition, a subsequent command previously buffered by the main controller can be immediately forwarded to the first controller. This operation can be repeated until an entire transaction has been completed, at which time, if desired, an interrupt can be generated.

To better illustrate features of the present invention, the exemplary FIG. 1 embodiment shows a first controller 100 which includes two general components: a controller bus sequencer means 102; and a microprocessor/direct memory access (DMA) interface means. All components other than the controller bus sequencer can be considered the microprocessor/direct memory access interface for receiving information from the main controller via data bus 112 of a first main bus.

The controller bus sequencer means includes a processor for executing each command of a transaction requested by the main processor. Upon completing execution of each command in a transaction, the first controller transmits status information to the main controller via the microprocessor/direct memory access interface. The controller bus sequencer also monitors the first controller's operation and bus status. Using this information, the bus sequencer generates the status signals which are sent to the main controller.

The operation status transmitted by the first controller to the second controller is selected from among a group of status responses which include:

(1) supplying a first output signal, designated herein as a Command Done signal, to the second controller on a Command Done signal line 106, the Command Done signal being indicative of the first controller 100 having completed execution of a requested operation;

(2) supplying the Command Done signal and a second output signal, designated herein as an Exception signal on an Exception signal line 108, the Exception signal being indicative of an acceptable but undesired condition, such as a loss of arbitration or a mismatch between an expected phase of the second bus and the actual phase of the second bus, during execution of the requested operation; and (3) supplying the Command Done signal and a third output signal, designated herein as an Error signal on Error signal line 110, the Error signal being indicative of an unacceptable error condition during execution of said operation.

Each of the Command Done, Exception and Error signal lines are supplied to the second controller such that the second controller can monitor them without the use of a hardware interrupt.

Figure 2:
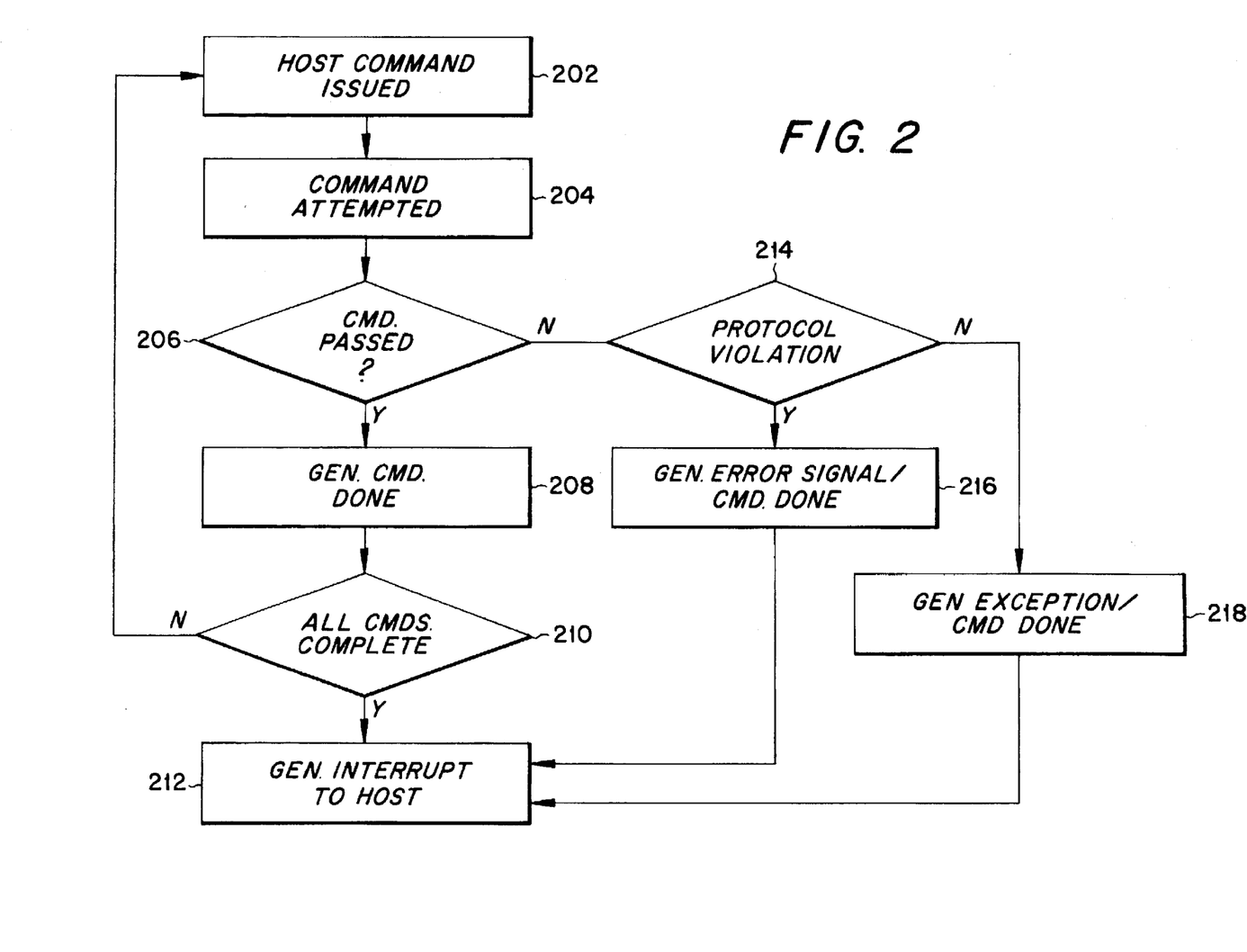
FIG. 2 shows a flow chart illustrating an exemplary operation implemented by the FIG. 1 controller.

The foregoing operation is illustrated in the FIG. 2 flow chart. In FIG. 2, the first command of a transaction is issued by the second (that is, the main) controller in step 202. The command is attempted by the first controller in step 204. If the command has been properly executed (i.e., passed) as reflected by the "YES" output of decision block 206, a Command Done signal is generated in block 208. In decision block 210, it is determined whether additional commands of the transaction remain to be executed; if so, operation returns to block 202. If no commands remain, an interrupt is generated in block 212.

If a "NO" decision occurs at decision block 206 for any command, a determination is made as to whether a protocol violation occurred in decision block 214. If so, both the Command Done signal and an Error signal are generated in block 216, after which an interrupt can be generated in block 212. Alternately, the main controller can be configured to recognize the Error signal as an indication that special intervention is required before the first controller can again begin processing or that a specific action should be taken (for example, an entire transaction should be restarted), without the use of an interrupt.

If no protocol violation occurred, then the Command Done signal and an Exception signal are generated in block 218, after which an interrupt can generated in block 212. Alternately, the main controller can be configured to recognize the Exception signal as an indication that a specific action should be taken (for example, an indication that the last attempted command should be re-issued) without the use of an interrupt.

Thus, the Command Done signal goes active (for example, TRUE) at the end of each command during execution of a transaction. If the Command Done signal goes active but the Exception and Error signals remain inactive (that is, FALSE), then the second controller can immediately issue the next command in a transaction. For example, the first controller can immediately begin execution of a data transfer operation after having successfully arbitrated for the local bus in response to an arbitration command, without the use of an interrupt from the first controller. Processing of the entire transaction therefore proceeds smoothly without a hardware interrupt to the main controller. Upon completion of the entire transaction, a single interrupt can be supplied from the first controller 100 to the main controller via an interrupt signal line 130 upon detection of a final bus free condition (for example, after a data transfer has been successfully completed).

Where the first controller is a small computer system interface, the Error signal can be asserted in response to violations of the standardized small computer system interface protocol. A SCSI parallel interface standard is described in the SCSI-2 ANSI document X3,131-1994 (SCSI-2) and in working draft of the document "X3T9.2/855D, Revision 12b, Jun. 7, 1993, reference number ISO/IEC: 199x/ANSI X3,199X", setting forth the standard for defining mechanical, electrical and timing requirements of SCSI-2 and SCSI-3 parallel interfaces for use with the SCSI-2 and SCSI-3 Interlocked Protocol Standards, the contents of which are hereby incorporated by reference in their entireties.

Aside from supplying the Command Done, Exception and Error signals, operation of the first controller 100 in FIG. 1 will be apparent to those skilled in the art and further description thereof is unnecessary. However, general operation of the first controller 100 will be provided to assist in better understanding aspects of the present invention.

In the exemplary FIG. 1 embodiment, the local bus of the first controller will transition through various phases during execution of a transaction. For example, the local bus of a small computer system interface can transition between bus phases which include a bus free phase, an arbitration phase, a selection phase, a reselection phase, a set-up phase, a command phase, a data-in phase, a data-out phase, a status phase, a message-in phase and a message-out phase. Such phases are described in the previously mentioned document "X3T9.2/855D revision 12b" for information transfer on the local bus between any two devices connected thereto. Whenever two devices communicate on the local bus of the first controller, one such device operates in an initiator mode (for originating an input/output process) while the other device operates in a target mode (to perform the input/output process requested).

In the exemplary FIG. 1 embodiment, wherein the first controller 100 is configured as a small computer system interface, the left hand side of the first controller represents the first, main bus for interfacing with the main controller. The main bus includes, for example, a 16-bit data bus 112 as a bi-directional data bus for interconnecting the first controller 100 with the main controller. The data bus 112 can be used for direct memory access and register access. An associated address bus 114 (for example, 4 bits) supplies data and address information from the main controller to the first controller 100.

The first controller also receives a read signal line 116, a write signal line 118 and a chip enable signal line 120 from the main controller. The read signal line is used during the reading of internal registers in the first controller, while the write signal line is used to write internal registers of the first controller. The chip enable signal line is used to access internal registers in response to address signals included on the 4-bit address line 114. A clock signal line 122 supplies a clock input, such as a 50 megahertz clock input. A reset signal line 124 supplies a reset signal to the first controller.

The first controller also includes handshaking signal lines for direct memory access (DMA) transfer. A DMA request signal line 126 is used by the first controller to indicate when the first controller is ready to transfer data to the main controller during a DMA transfer. A DMA acknowledge signal line 128 is an input signal line to the first controller which indicates when a DMA interface is ready to transfer data to the first controller. When the signal line 126 or 128 is enabled, accesses to a FIFO register 172 by the main controller, or by any peripheral device connected to the first controller's local bus, are disabled.

The interrupt signal line 130 is used in conjunction with the Command Done, Exception and Error status signals, as described previously. In accordance with exemplary embodiments, the interrupt signal line 130 is used to supply an interrupt signal to the main controller upon completion of a transaction, or upon occurrence of an error or exception (that is, whenever an interrupt register 186 is non-zero and an appropriate bit has been set in an interrupt mask register 188).

The right hand side of the exemplary first controller shown in FIG. 1 represents the local bus of the first controller. The local bus can, for example, be a peripheral device bus which is connected to one or more peripheral devices, such as memory devices (e.g., disk drives, tape drives and so forth), printers or any other intelligent or non-intelligent device. Those skilled in the art will appreciate that where the first controller is a network interface, the second bus can be a network communication link, such as a network bus or wireless link.

The first controller 100 includes an output busy signal line 132 which is asserted by the first controller when it has control of the second bus, and an input busy signal line 134 which is asserted by a target device which has control of the second bus. An output selection signal line 136 is asserted by the first controller when it selects a destination device, and an input selection signal line 138 is asserted by another device connected to the second bus for selecting the first controller as a destination. A bi-directional attention signal line 140 provides a signal which is used to monitor phase mismatches of the second bus, and generate an Exception signal.

A bi-directional control/data (CD) signal line 142, bus input/output (I/O) signal line 144, and bus message signal line 146 are used to define bus phases during execution of a given transaction in known fashion. The control/data signal, which is sourced by the target device, also indicates whether control or data information is on the data signal lines. The input/output signal line, which is sourced by the target device, also controls the direction of data movement on the local bus relative to an initiator device; further, this signal line can also be used to distinguish selection and reselection phases. The message signal is sourced by the target device to indicate the message phase.

Input/output bus reset signal lines 148, 150 are provided for sending and receiving reset signals. Output/input request signal lines 152, 154 and output/input acknowledge signal lines 156, 158 are provided to send and receive request and acknowledgement handshaking signals during data transfer.

Output data from the first controller 100 is provided to the second bus via an output data signal line 160 (for example, 8-bits) which can include a data parity signal line 162. An input data signal line 165 can include a data parity signal line 166.

In accordance with exemplary embodiments, information transfer signals received by the first controller via the second bus can be received using features as described in accordance with commonly assigned, co-pending U.S. patent application Ser. No. 08/432,817, filed May 2, 1995 still pending, entitled "METHOD AND APPARATUS FOR INCREASING RELIABILITY OF INPUT/OUTPUT CONTROLLERS USING SEPARATE FILTERED AND UNFILTERED INPUTS"; U.S. patent application Ser. No. 08/432,804 filed May 2, 1995 still pending entitled "METHOD AND APPARATUS FOR ENHANCING INFORMATION TRANSFER RELIABILITY OF AN INPUT/OUTPUT CONTROLLER USING TIME-DOMAIN FILTER"; and U.S. application Ser. No. 08/432,803, filed May 2, 1995 still pending entitled "METHOD AND APPARATUS FOR ENHANCING INPUT/OUTPUT CONTROLLER OPERATION USING A SIGNAL LATCH", the disclosure of which are all hereby incorporated by reference.

Having described the input/output signal lines of the FIG. 1 controller, attention will now be directed to the various registers illustrated in FIG. 1. The first controller 100 can include an identification (ID) register 170 for revision identification information (i.e., a current version of the first controller's internal architecture). The first-in first-out register 172 buffers read or write information to or from a first-in first-out memory 176

The first-in first-out memory 176 buffers data transferred between the first bus (that is, the bus interconnecting the first controller to the main controller) and the second bus (that is, the local bus of the first controller). A first-in first-out count register 174 identifies the number of bytes stored in the first-in first-out memory 176 at any given time.

Transfer count registers 178 and 180 indicate the number of bytes expected to be transferred in an information transfer phase. Bus status register 182 and 184 store the current status of the second bus.

Exemplary embodiments include an interrupt register 186 and an interrupt mask register 188. These registers can,if desired, be used to signal an interrupt to the main controller, after which the interrupt mask register 188 can be examined (e.g., polled) to determine the cause of the interrupt in conventional fashion. However, exemplary embodiments eliminate any need to use the interrupt register in executing a complete transaction.

A sequence register 190 is used to direct the first controller into a particular "phase" of the second bus. The target device, for any given transaction, will typically drive the phases of the local bus. Accordingly, where the first controller is in an initiator mode, the requested sequence is one expected to be entered by the target device. When the first controller is in the target mode, the phase is one which the first controller will enter next.

Bit locations of the sequence register, in accordance with exemplary embodiments, are designated as follows: (1) a first bit location indicates whether an information transfer is to be done using direct memory access; (2) a target mode bit location indicates that the first controller is to be placed into the target mode for executing a command identified within subsequent bit locations of the sequence register; this bit location is cleared when the first controller is placed into an initiator mode; (3) an attention bit location indicates, for initiator mode selection and information transfer phases, that the attention signal line will be asserted (in initiator mode) or compared against this bit (in target mode); and (4) a four-bit location designates an encoded value of a given command to be executed.

In accordance with exemplary embodiments where the first controller is a small computer system interface, the message, control/data and input/output signals can be used to identify up to eight different information transfer phases. Six phases which are used in conjunction with the SCSI-3 protocol are: (1) a data-out phase; (2) a data-in phase; (3) a command phase; (4) a status phase; (5) a message-out phase; and (6) a message-in phase. In addition to the information transfer phases, connection phases can also provided and include: (1) an arbitration phase; (2) a selection (or reselection) phase; and (3) a bus free phase. In accordance with exemplary embodiments, a target device continuously maintains the state of phase signals until a request is received which results in a change of state.

Given the foregoing phases, commands which can be encoded into the sequence register include: (1) an arbitrate command; (2) a selection command; (3) a command-phase command; (4) a status command; (5) a data-out command; (6) a data-in command; (7) a message-out command; and (8) a message-in command.

The arbitrate command, during normal processing, is completed when arbitration has been won. If arbitration has been lost, the Exception is asserted. If a reset signal is asserted during execution of the arbitrate command, then the Error signal is asserted.

The arbitrate command is used to initiate arbitration for the local bus. This command places the source identification information stored in the source identification register 198 on the local bus to perform bus arbitration. If the source identification stored in the register 198 is of highest contending priority, then the first controller asserts the selection command on selection signal line 136 and arbitration has been won. However, if another device on the second bus has higher priority or has asserted its selection signal, the first controller has lost arbitration and will release its busy signal on busy signal line 132 and arbitration identification. As a result, an arbitration lost bit in the exception register 194 is set, such that the Command Done and Exception signals are asserted and an interrupt generated.

The selection command, during normal operation, is completed when a designated destination has been selected. However, if the time in the select time-out register is exhausted, then the Command Done and Exception signals are asserted. The Error signal is asserted during execution of the selection command if a reset signal is asserted.

The selection command is executed when arbitration has been won. To effect a selection command, the first controller asserts the identification indicated in the destination identification register 200, along with a source identification from the source identification register 198, and then deasserts the busy signal on busy signal line 132. The first controller waits, for the time specified in the select time-out register 196, for the busy signal to be asserted by the destination device. If the attention bit of the sequence register has been set, the attention signal is asserted before releasing the busy signal. If the first controller is in the target mode, then the input/output signal is asserted and a reselection phase is entered.

Once a destination has been selected, an information transfer command, or service, can be used to initiate information transfer. The command-phase command, status command, data-out command, data-in command, message-out command and message-in command constitute data transfer commands. In normal operation, these commands are executed until the transfer count stored in the transfer count register has been exhausted.

For example, when command information is to be transferred from an initiator device to a target device, a command request is received by the target device. In accordance with standard SCSI-3 protocol, a command phase is identified by the target device asserting the control/data signal and negating the message and input/output signals. In response, the initiator places the command information on the data bus and begins an information transfer.

The status service is used to transfer status information from the target device to the initiator device. The data-out service is used to transfer data from the initiator device to the target device. The data-in service is used to transfer data from the target device to the initiator device. The message-out and message-in services are used to transfer a message from the initiator device to the target device or vice versa. For any of the information transfer commands, if the attention flag is set, the attention signal is asserted before negating the acknowledge signal; if the attention flag is cleared, the attention signal is negated prior to asserting the acknowledge signal.

As mentioned above, information transfer commands are executed until the transfer count stored in the transfer count registers is exhausted. However, execution of these commands can be discontinued if: an Exception signal is asserted (for example, in response to a flag in an exception register being asserted, such as a phase mismatch); or an Error signal is asserted (for example, a flag in an error register being asserted). For example, if during execution of the information transfer commands, a phase mismatch is detected, the Exception signal is asserted. If during execution of any of these data transfer commands, the reset signal becomes active, then the Error signal is asserted. The Error signal is also asserted during execution of the status command, the data-in command or the message-in command if a parity error is detected.

A phase mismatch of the small computer system interface bus illustrated in the exemplary FIG. 1 embodiment can be detected in known fashion. For example, when the second controller requests the first controller to execute a given command in a transaction which includes multiple commands, the command is stored in the sequence register 190. The command stored in the sequence register can be decoded by the bus sequencer to identify an expected phase (that is, expected values of the message, control/data and input/output values) which the first controller's bus should be placed into during execution of the command.

When the bus sequencer executes the command, the actual bus phase of the local bus, as detected by monitoring the message, control/data and input/output signal lines, is compared against the expected bus phase as stored. If the phase stored in the bus status registers matches that of the bus sequencer, no phase mismatch has occurred and the command can be executed. In contrast, if the actual phase of the second bus does not match the expected phase stored, then the bus sequencer indicates that a phase mismatch has occurred by setting a flag in the Exception register. Consequently, the Exception signal will be generated in conjunction with the Command Done signal, such that, the second controller can execute a user configured response. For example, the second controller can reissue the previously requested command to the first controller.

In addition to a phase mismatch as described above, other conditions can also result in a phase mismatch. Those skilled in the art will appreciate that any condition specified by the user can be specified as a phase mismatch condition. For example, if the target mode bit of the sequence register is set such that the first controller is in a target mode condition, the first controller will set the local bus phase status signals (i.e., the message, control/data and input/output commands) to the appropriate state and the request/acknowledge handshaking is used for information transfer. In this target mode, the attention bit in the sequence register can used as a phase comparison bit which is compared against the attention signal on attention signal line 140 at a trailing edge of the acknowledge signal. If the state of the attention bit in the sequence register does not match that of the attention signal on a trailing edge of the acknowledge signal, a phase mismatch is detected and used to assert an Exception signal. At that time, the transfer of data is discontinued and a message-out phase entered for the purpose of allowing an initiator device-to-target device information transfer.

In addition to storing a requested command, the sequence register also can include bit locations to designate a bus free condition. A bus free condition is used to indicate that the local bus is expected to transition to a bus free phase, wherein the busy and selection signals are both false. Note that upon completion of a transaction, the busy signal is cleared. If a phase mismatch is detected during transition to a bus free condition, the Exception signal is asserted. If a reset signal is asserted during execution of a bus free condition, then the Error signal is asserted.

When the first controller is in an initiator mode, before the bus free condition is indicated, the acknowledge signal will be negated and then the busy signal is expected to go false. If the first controller detects a request has been asserted before the busy signal goes false, then the phase mismatch bit will be set and an Exception signal is asserted. If the target mode bit is set, the first controller will release the busy signal from the bus.

In addition to the sequence register described above, the first controller 100 also includes an error register 192 for storing an error status and the exception register 194 for storing an exception status. Further, the first controller includes a selection time-out (TO) register 196 for storing a selection time-out condition, the source identification register 198 for storing a bus identification of the first controller (that is, for use during arbitration), the destination identification register 200 for storing an identification of a device to be selected or reselected, and a synchronization register 202 for storing synchronization parameters used in conjunction with a synchronization mode, depending on the speed with which information is to be transferred.

The Command Done signal is used as a status signal for indicating when a given command has been completed by the first controller. When the command has not been properly executed, the Exception register, the Error register and the interrupt register are used to supply such additional status information.

More particularly, the exception register 194 identifies conditions which are usually not errors, but which can cause the sequence to stop for processor intervention. Whenever any bit location of the exception register is set, an exception signal is generated by the first controller to the second controller. The exception register is cleared by writing the register with 1's in the bits to be cleared or by writing a 1 in the exception bit location in the interrupt register.

The exception register 194 includes any one or more of: (1) a bit location which is set if the first controller has been selected as a target and the attention signal on the second bus has been asserted; (2) a bit location which is set if the first controller has been selected as a target and the attention signal was not asserted at the time of selection; when set, this bit location indicates that the target device identification and initiator device identification are stored in the last byte of the first-in first-out memory 176; (3) a reselected bit location which is set if the first controller is reselected as a host; when set, the target device identification and the initiator device identification are stored in the last byte of the first-in first-out memory 176; (4) a phase mismatch bit location which is set if a certain phase was expected but another phase is driven by the target device; when set, the bus status register 182 can be interrogated to determine the current phase of the bus and to take appropriate action (that is, generate an Exception signal); and (5) a select time-out bit which is set if the time indicated within the selection time-out register has exhausted prior to the destination device being selected.

The error register 192 includes bits which indicate when various error conditions are TRUE. The Error signal can be set by the first controller whenever any bit in the error register 192 is set to an asserted condition. This register is cleared by writing 1's to the bits to be cleared or by writing a 1 to an error bit in the interrupt register.

In an exemplary embodiment, the error register includes: (1) a bit location to indicate that a target device released the busy signal somewhere between a successful selection and the issuing of a bus free command; (2) a reset signal bit location to indicate whether the reset signal was or is asserted as a reset interrupt; after receiving the reset interrupt, the bus reset signal (bit 7 of bus status register 182) is polled until reset goes away; (3) a sequence error bit location to indicate that a command was issued to the first controller while an Exception or Error signal was pending; and (4) parity error bit locations which indicate if, for example, the calculated parity of incoming data does not match the parity bit supplied on incoming data parity signal line 166.

The interrupt mask register 186 is used to mask out interrupts from any or all of the interrupt sources. The interrupt register combines a status of the Error, Exception and Command Done signals into one interrupt source. More particularly, the error bit of the interrupt register represents that the Error signal has been set. An Exception bit is used to indicate when the exception signal is set, and a command done bit is used to indicate that the Command Done signal has been set.

Those skilled in the art will appreciate that the exemplary embodiment of FIG. 1, as described with respect to a small computer system interface is by way of example only, and that features of the present invention can be implemented with any protocol-based controller. Further, those skilled in the art will appreciate that the first controller can exploit features of the present invention regardless of whether it operates in an initiator mode or in a target mode.

In operation, the Command Done, Error and Exception signals can be supplied from the first controller to the second controller to accelerate operational efficiency. When a given command has been requested by the second controller, the expected phase of the first controller's local bus is decoded by the bus sequencer. For example, if the second controller has successfully requested that the first controller arbitrate for the second bus and has successfully selected a destination device to which information is to be transferred, the next command sent by the second controller to the first controller is an information transfer command.

If the information transfer command is a data-in command, the expected phase of the second bus would be setting of the message signal and the control/data signal to logic level lows and setting the input/output signal to a logic level high. The bus sequencer then executes the information transfer command. In executing the command, the bus sequencer monitors the actual status of the message, control/data and input/output signals on its local bus and compares these actual signals with the expected phase signals. If the phases match, the information transfer is executed. However, if there is a phase mismatch, as indicated by the message, control/data and input/output signals not matching those stored in the bus status registers, an exception bit of the exception register can be set.

In response, the Exception signal and the Command Done signal are sent by the first controller to the second controller. The second controller can respond to the Exception signal by, for example, being programmed to recognize the Exception signal as an indication that the previous command should be re-issued. In the foregoing example, the second controller, having successfully arbitrated for the first controller's local bus and selected a destination, can re-issue the information transfer command.

If a reset signal was received during execution of the information transfer command, an error bit in the error register can be set. In response, an Error signal and a Command Done signal are supplied by the first controller to the second controller. In response, the first controller can be programmed to recognize the combination of the Error signal and the Command Done signal as an indication that a complete transaction should be re-executed. In the foregoing example, the second controller would therefore again begin the requested information transfer transaction by again sending the arbitration command to the first controller in an effort to have the first controller arbitrate for control of its local bus.

Of course, those skilled in the art will appreciate that a phase mismatch or reset as described in the foregoing example are not the only types of exception and error conditions which can be used to generate the Error and Exception signals. On the contrary, any conditions detected by the bus sequencer can be used to generate Exception or Error signals.

It will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

What is claimed is:

1. Method for accelerating operation of a first controller which communicates with a second controller, comprising the steps of:

receiving information from the second controller which designates an operation to be executed by the first controller; and generating, upon execution of said operation, an operation status of said first controller for transmission to said second controller, said operation status being selected from among a group of status responses which include:

supplying a first output signal to the second controller, said first output signal being indicative of the first controller having completed execution of said operation; and supplying said first output signal and a second output signal to the second controller, said second output signal being indicative of an acceptable but undesired condition during execution of said operation, with a supply of said first output signal in an absence of said second output signal being indicative of successful execution of said operation.

2. Method according to claim 1, wherein said second output signal signals said second controller to reissue a command to said first controller.

3. Method according to claim 2, wherein said operation is a request by said second controller that said first controller arbitrate for control of a local bus connected to said first controller, and said undesired condition is an inability of said first controller to win arbitration in response to said request.

4. Method according to claim 2, wherein said operation is a request by said second controller that said first controller arbitrate for control of a local bus connected to said first controller, and said undesired condition is a phase mismatch between an expected state of said local bus and an actual state of said local bus.

5. Method according to claim 1, wherein said status responses further include:

supplying said first output signal and a third output signal to the second controller, said third output signal being indicative of an unacceptable error condition during execution of said operation.

6. Method according to claim 5, wherein said third signal is generated in response to a reset command from said second controller.

7. Method according to claim 5, wherein said third signal indicates that said first controller requires intervention prior to execution of a succeeding request from the second controller.

8. Method according to claim 7, wherein said third signal signals said second controller to restart a transaction which includes said operation, said operation being a command in a multiple command transaction.

9. Method according to claim 5, wherein said operation is a command of a multiple command transaction, and upon a supply of said first signal in an absence of said second and third signals, each command of said multiple command transaction is executed without generating an interrupt from said first controller to said second controller.

10. Method according to claim 1, further including the steps of:

storing an expected phase of a local bus of said first controller in response to a command to execute said operation from said first controller;

comparing said expected phase with an actual phase of said local bus; and generating said second signal when a phase mismatch between said expected phase and said actual phase is detected.

11. Method for accelerating operation of a first controller which transfers information between a first device and a second device, said first controller communicating with said first device via a first bus, and communicating with said second device via a second bus, said method comprising the steps of:

executing a transaction for transferring information from said first device to said second device;

monitoring an actual phase of said second bus;

comparing said actual phase of said second bus with an expected phase of said second bus; and generating status signals on said first bus in response to said step of comparing.

12. Method according to claim 11, further including a step of selecting said status signals from among a group of status responses which include:

supplying a first output signal to the first device, said first output signal being indicative of the first controller having completed execution of said operation; and supplying said first output signal and a second output signal to the first device, said second output signal being indicative of an acceptable but undesired condition during execution of said operation, with a supply of said first output signal in an absence of said second output signal being indicative of successful execution of said operation.

13. Method according to claim 12, wherein said status responses further include:

supplying said first output signal and a third output signal to the first device, said third output signal being indicative of an unacceptable error condition during execution of said operation.

14. Method according to claim 13, wherein a supply of said first signal in an absence of said second and third signals results in each command of said transaction being executed without generating an interrupt from said first controller to said first device.

15. Apparatus for accelerating operation of a first controller which communicates with a second controller, comprising:

an input/output for receiving information from the second controller which designates an operation to be executed by the first controller;

a processor for executing said operation and for determining an operation status of said first controller for transmission to said second controller upon execution of said operation, said operation status being selected from among a group of status responses which include:

supplying a first output signal to the second controller, said first output signal being indicative of the first controller having completed execution of said operation; and supplying said first output signal and a second output signal to the second controller, said second output signal being indicative of an acceptable but undesired condition during execution of said operation.

16. Apparatus according to claim 15, wherein said status responses further include:

supplying said first output signal and a third output signal to the second controller, said third output signal being indicative of an unacceptable error condition during execution of said operation.

17. Apparatus according to claim 16, further including:

a register for storing an error status used to generate said third output signal.

18. Apparatus according to claim 15, further including:

a first signal line for sending said first output signal to said second controller; and a second signal line for sending said second output signal to said second controller.

19. Apparatus according to claim 18, further including:

a third signal line for sending said third output signal to said second controller.

20. Apparatus according to claim 15, further including:

a register for storing an expected phase of a local bus of said first controller; and a bus sequencer for comparing said expected phase stored in said register with an actual phase of said local bus.

21. Apparatus according to claim 15, further including:

a register for storing an exception status used to generate said second output signal.

22. Method for accelerating operation of a first device which communicates with a second device, comprising the steps of:

receiving information from the second device which designates an operation to be executed by the first device; and generating, upon execution of said operation, an operation status of said first device for transmission to said second device, said operation status being selected from among a group of status responses which include:

supplying a first output signal to the second device, said first output signal being indicative of the first device having completed execution of said operation; and supplying said first output signal and a second output signal to the second device, said second output signal being indicative of an acceptable but undesired condition during execution of said operation;

supplying said first output signal and a third output signal to the second device, said third output signal being indicative of an unacceptable error condition during execution of said operation, wherein said operation is a command of a multiple command transaction and upon a supply of said first signal in an absence of said second and third signals, each command of said multiple command transaction is executed without generating an interrupt from said first device to said second device.

23. Method according to claim 22, wherein said second output signal signals said second device to reissue a command to said first device.

24. Method according to claim 23, wherein said third signal is generated in response to a reset command from said second device.

* * * * *